United States Patent
Maeda et al.

(10) Patent No.: US 7,622,204 B2
(45) Date of Patent: *Nov. 24, 2009

(54) MAGNETIC RECORDING MEDIUM AND MAGNETIC RECORDING APPARATUS

(75) Inventors: Tomoyuki Maeda, Kawasaki (JP); Akira Kikitsu, Yokohama (JP); Soichi Oikawa, Kawasaki (JP); Takeshi Iwasaki, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 555 days.

This patent is subject to a terminal disclaimer.

(21) Appl. No.: 11/076,114

(22) Filed: Mar. 9, 2005

(65) Prior Publication Data
US 2005/0214590 A1    Sep. 29, 2005

(30) Foreign Application Priority Data
Mar. 25, 2004    (JP) .............................. 2004-090672

(51) Int. Cl.
G11B 5/66    (2006.01)
(52) U.S. Cl. .................................................. 428/832
(58) Field of Classification Search ................. 428/832, 428/832.3
See application file for complete search history.

(56) References Cited

U.S. PATENT DOCUMENTS

| | | | |
|---|---|---|---|
| 5,738,927 A | 4/1998 | Nakamura et al. | |
| 6,535,346 B1 | 3/2003 | Asano et al. | |
| 6,884,521 B2 * | 4/2005 | Takahashi et al. | 428/832 |
| 7,056,604 B2 * | 6/2006 | Kanbe et al. | 428/832 |
| 2002/0048693 A1 | 4/2002 | Tanahashi et al. | |
| 2003/0215675 A1 | 11/2003 | Inaba et al. | |
| 2004/0033390 A1 | 2/2004 | Oikawa et al. | |
| 2004/0048092 A1 * | 3/2004 | Yasui et al. | 428/642 |
| 2004/0130974 A1 * | 7/2004 | Awano et al. | 369/13.38 |
| 2005/0214590 A1 * | 9/2005 | Maeda et al. | 428/832 |
| 2005/0214591 A1 | 9/2005 | Maeda et al. | |
| 2005/0214592 A1 | 9/2005 | Maeda et al. | |
| 2008/0090002 A1 | 4/2008 | Maeda et al. | |
| 2008/0260942 A1 | 10/2008 | Maeda et al. | |

FOREIGN PATENT DOCUMENTS

| | | |
|---|---|---|
| CN | 1254909 A | 5/2000 |
| EP | 0 994 474 A1 | 4/2000 |
| JP | 3-23518 | 10/1991 |

(Continued)

OTHER PUBLICATIONS

Japanese Office Action dated Dec. 25, 2009 for Appln. No. 2004-090672.

*Primary Examiner*—D. Lawrence Tarazano
*Assistant Examiner*—Gary D. Harris
(74) *Attorney, Agent, or Firm*—Pillsbury Winthrop Shaw Pittman, LLP

(57) ABSTRACT

A large grain diameter under-layer of at least one selected from Cu, Ni or Rh, comprising large average diameter crystalline grains of 50 nm or more than 50 nm with the (100) crystal plane of the grains oriented parallel to the substrate surface, was formed on a substrate. Then, a magnetic recording layer was deposited on the under-layer. The magnetic recording medium carrying this structure showed very small magnetic crystalline grains in magnetic layer, and excellent overwrite characteristics and signal to noise ratio at high recording density.

16 Claims, 12 Drawing Sheets

FOREIGN PATENT DOCUMENTS

| | | |
|---|---|---|
| JP | 3-235218 A | 10/1991 |
| JP | 5-135342 | 6/1993 |
| JP | 6-259764 | 9/1994 |
| JP | 10-92637 | 4/1998 |
| JP | 11-154321 | 6/1999 |
| JP | 2000-200410 | 7/2000 |
| JP | 2001-56922 | 2/2001 |
| JP | 2003-338029 | 11/2003 |
| JP | 2004-272958 | 9/2004 |
| JP | 2005-276363 | 10/2005 |
| JP | 2005-276364 | 10/2005 |
| WO | WO 02/39433 | 5/2002 |

* cited by examiner

MAGNETIC RECORDING MEDIUM AND MAGNETIC RECORDING APPARATUS

CROSS-REFERENCE TO RELATED APPLICATIONS

This application is based upon and claims the benefit of priority from the prior Japanese Patent Application No. 2004-090672, filed on Mar. 25, 2004; the entire contents of which are incorporated herein by reference.

BACKGROUND OF THE INVENTION

1. Field of the Invention

The present invention relates to magnetic recording media and magnetic recording apparatus in which the recording media are equipped, in particular, to magnetic recording media having high recording density and magnetic recording apparatus such as hard disk drives in which the high-density recording media are equipped.

2. Description of the Related Art

Hard disk drives (HDDs) have been expanding their application scope from the first computer related application to various other applications, such as home video recorder and car carrying navigation system applications as magnetic recording systems for recording and reproducing information. The expansion is due to their advantage of high data access speed and high data storage reliability and so on in addition to their high recording capacity performance with low cost. Requirements for HDDs having larger recording capacity have been increased with the expansion of the HDD application scope. Replying to the requirements, large capacity recording technology has been advanced by increasing recording density of the magnetic recording media.

With increasing recording density of the magnetic recording media of HDDs, the recording bit sizes and the diameters for the magnetization reversal units became very small. As the result, decreasing phenomena of the recorded signal magnetization and the recording and reproducing performance caused by thermal fluctuation were obviously appeared for the very small magnetization reversal units. Furthermore, noise signals which appear at boundary regions between recording bits became large as a result of decreasing recording bits to a very small size, and the noise gave a large influences upon the signal to noise ratio. For the purpose of attaining further high recording density, it is required to obtain thermal stability of the recorded signal magnetization at one hand, and is required to attain low noise characteristics at high recording density at the other hand.

In order to decrease magnetic recording medium noise, size of magnetic crystalline grains constructing recording-layer have been made smaller up to now. For example, magnetic crystalline grains of Co—Cr magnetic-layer of widely used magnetic recording media have been made small by adding small amount of Ta or B (refer to Japanese Patent Laid-open Applications Nos. HEI 11-154321 and 2003-338029), and by precipitating nonmagnetic Cr by heat treating at appropriate temperature (refer to Japanese Patent Laid-open Applications Nos. HEI 3-235218, and HEI 6-259764). Recently, a method for obtaining magnetic recording layer having so called granular structure obtained by adding oxides such as $SiO_x$ to the magnetic layer was applied. In the granular structured magnetic layer, nonmagnetic grain boundary material encloses magnetic crystalline grains (refer to Japanese Patent Laid-open Applications Nos. HEI 10-92637, and 2001-56922).

Since these methods are not sufficient for making the magnetic crystalline grains of the magnetic layers smaller and are not sufficient for separating each grains magnetically, a method of using under-layers having smaller grain diameters was applied to obtain smaller magnetic crystalline grains (refer to Japanese Patent Laid-open Applications Nos. HEI 10-92637, and 2000-200410 for example) in addition to the methods described above.

As the crystalline grains in the under-layer are made small, however, there occurred a problem of decreasing the crystalline grain orientation degree in the under-layer. The decrease of under-layer crystalline orientation degree influences upon the magnetic crystalline grains as a decrease of crystalline orientation degree, and that results in decreases of overwrite characteristics and signal to noise ratio of the recording and reproducing characteristics.

SUMMARY

The present invention is directed to give a solution to the problem. The purpose of the present invention is to present a novel magnetic recording medium having excellent overwrite characteristics and signal to noise ratio (SNR) realizing a small average grain diameter without decreasing the crystalline orientation degree, and a magnetic recording apparatus equipped with the recording medium.

The inventors of the present invention have performed various exploring works and have got the following interest finding. The finding is that good crystallinity, good orientation degree similar to the under-layer and very small grain diameters are realized for the magnetic crystalline grains in the magnetic recording layer, when the magnetic recording layer is formed on a crystalline grains under-layer of Cu, Ni, Rh or Pt having average diameter of 50 nm or more and oriented their (100) planes parallel to the substrate surface. After performing further detailed work for the finding, the inventors completed the present invention.

The magnetic recording medium of the present invention comprises a substrate, a large grain diameter under-layer formed on the substrate, a magnetic recording layer on the under-layer, a protecting layer formed on the magnetic recording layer, the large grain diameter under-layer comprising crystalline grains of at least one selected from the group consisting essentially of Cu, Ni, Rh and Pt, having average grain diameter $d_c$ of $d_c \geqq 50$ nm, and orienting (100) planes of the grains parallel to the substrate surface.

The crystalline grains of the large grain diameter under-layer having broader flat surface at atomic level are desirable. Experimental results show that the desirable average grain diameter of the crystalline grains is 50 nm or larger, and more desirable diameter is 100 nm or larger. A single crystal film having no grain boundary is further desirable.

The crystalline grains of the large grain diameter under-layer are desirable to have broader flat surfaces. The desirable average grain diameter is 50 nm or larger than 50 nm. The average grain diameter of 100 nm or larger is further desirable. A single crystal film having no grain boundary is much more desirable. Even if the film surface is not sufficiently even having a certain degree of roughness, the film can be available when the film has large fraction of terrace surfaces that form the film surface.

The present invention is very interesting because small grain diameters can be obtained by using under layers having large grain diameter of 50 nm or more, contrary to the procedure previously used to obtain small grain diameters. The mechanism of realizing small grain diameters is not clear at present. It is considered that the improvement of the recording and reproducing characteristics of the recording media according to the present invention seems to be obtained partially by an improvement of the total film flatness including protective layer due to the excellent under-layer crystallinity.

Furthermore, the magnetic recording and reproducing apparatus of the present invention comprises the magnetic recording medium described above, a recording medium driving mechanism, driving the magnetic recording medium, a recording and reproducing head mechanism, recording information to the magnetic recording medium and reproducing from the magnetic recording medium, a head driving mechanism, driving the recording and reproducing head and a recording and reproducing signal processing system, processing recording signals and reproducing signals.

The present invention provides a novel means for obtaining magnetic layer having very small magnetic crystalline grains and magnetic recording media for high density recording having excellent overwrite characteristics and increased signal to noise ratio.

DETAILED DESCRIPTION

Hereinafter, embodiments of the present invention will be described in detail with reference to the drawings.

Figure 1:
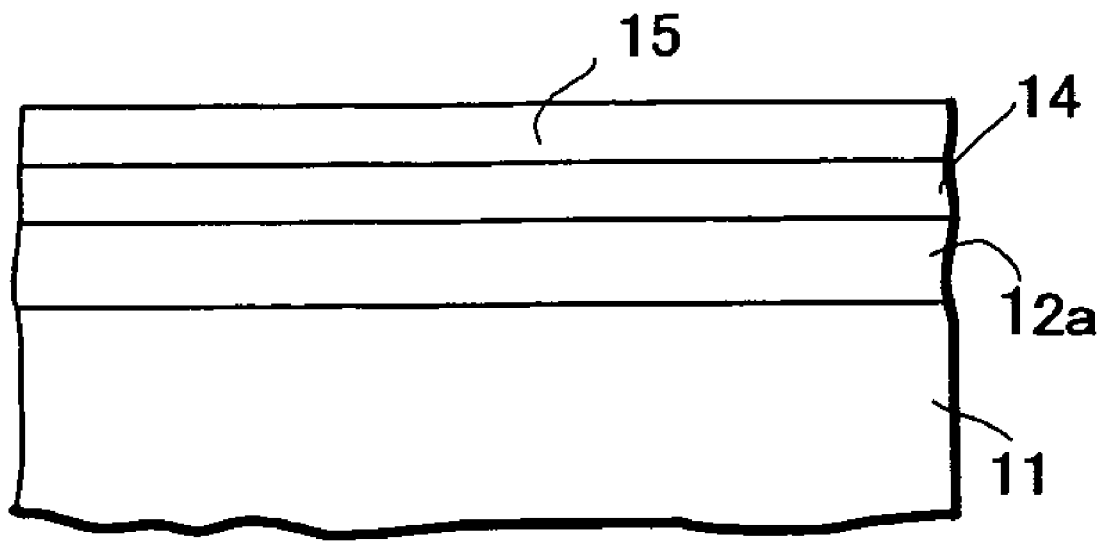
FIG. 1 is a schematically shown cross section view of a magnetic recording medium according to an embodiment of the present invention.

FIG. 1 is a schematically shown cross section view of a magnetic recording medium according to an embodiment of the present invention. A large grain diameter underlayer 12a of at least one selected from Cu, Ni, Rh, and Pt is disposed on a substrate 11 as shown in FIG. 1. In the large grain layer 12a, crystalline grains are oriented such that each (100) plane is parallel to the plane of the under-layer, and average diameter of the grains are 50 nm or more. A magnetic recording layer 14 is disposed on the large grain layer 12a, and a protective layer 15 is formed on the magnetic recording layer 14. Furthermore, a lubricant layer not shown in the figure is formed on the protective layer 15.

For the purpose of promoting the growth of the crystalline grains in the large grain diameter under-layer 12a, the substrate can be heat-treated before the deposition, in the midst of the deposition or after the deposition if necessary. The heat treatment can be executed in a reducing gas atmosphere such as hydrogen gas if necessary. In this case, a small amount of hydrogen absorption is allowable.

The large grain diameter under-layer 12a having crystalline particles in which crystal planes are orientated to a direction is desirable because the under-layer increases the magnetic particle orientation of the magnetic recording layer. The orientation degree can be evaluated by an X-ray diffraction method. Experimental results show that very small grain diameter was obtained for the magnetic recording layer when the large grain diameter under-layer comprised Cu, Rh, or Ni crystalline grains oriented with (100) crystal plane.

The magnetic crystalline grains having average grain diameter of 20 nm or less are desirable for obtaining higher SNR, and the magnetic crystalline grains having an average diameter range from 7 to 2 nm are more desirable. When the average grain diameter of the magnetic crystalline grains is above 20 nm, the SNR decrease is substantial, and when the average grain diameter of the magnetic crystalline grains is less than 2 nm, thermal fluctuation durability deterioration is substantial. For magnetic recording medium having double or multiple magnetic layers, either one of the layers is required to have the average diameter in the range described above.

For increasing grain growth of the large grain diameter under-layer, amount of carbon, nitrogen, and sulfur atoms contained in the large grain diameter under-layer are desirable to be as small as possible. The total amount of less than 10,000 ppm is desirable, and less than 1,000 ppm is more desirable. The amount of these atoms can be evaluated by auger electron spectroscopy (AES) or secondary ion mass spectroscopy (SIMS), for example.

The very small magnetic crystalline grains in the magnetic recording layer 14 are formed in spite of using large grain diameter under-layer forming plural number of crystalline grains on average on a crystalline grain of the grain diameter control layer 12a. Average areal density of the magnetic crystalline grains in the magnetic recording layer 14 in a range from $1 \times 10^{12}$ grains/cm$^2$ to $8 \times 10^{12}$ grains/cm$^2$ is desirable for obtaining increased SNR. The SNR decreases when the average areal density of the magnetic crystalline grains is less than $1 \times 10^{12}$ grains/cm$^2$, and also when the average areal density is above $8 \times 10^{12}$ grains/cm$^2$.

Figure 2:
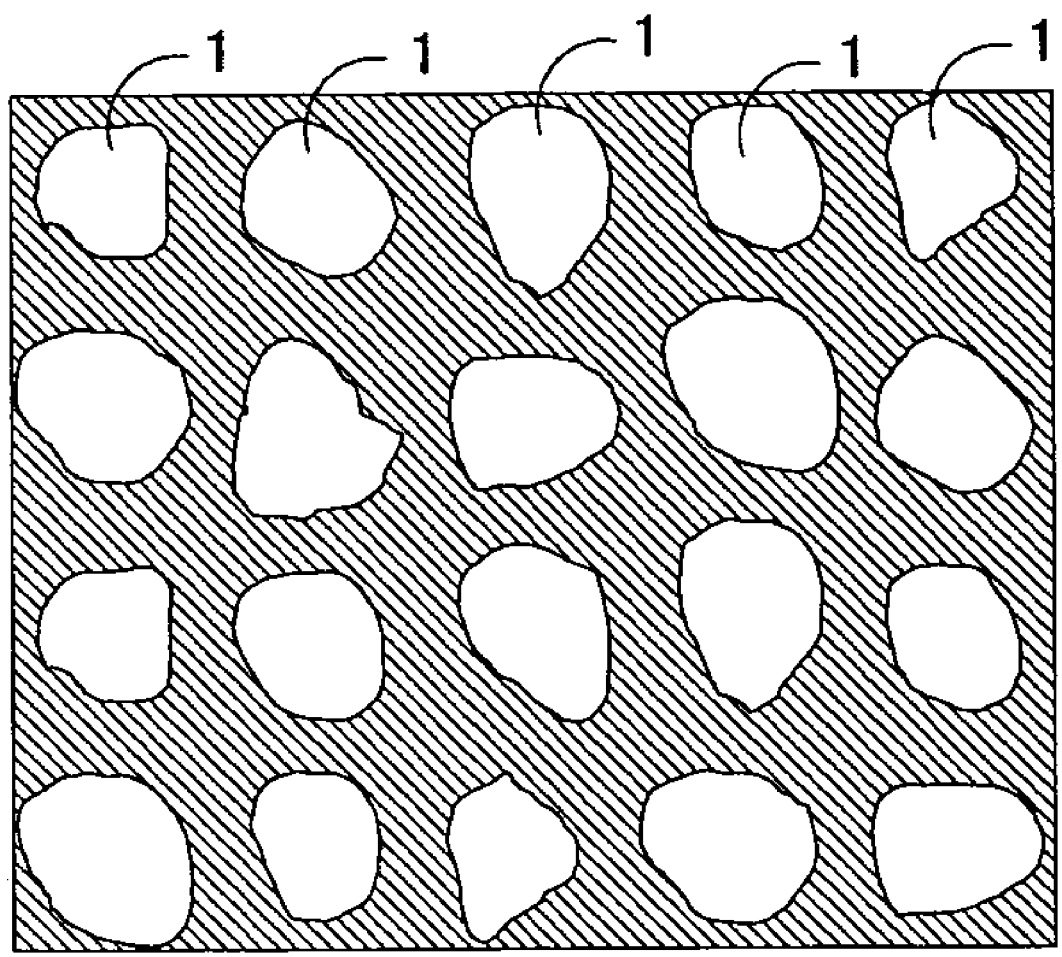
FIG. 2 is a schematically shown in plane view of a magnetic recording layer for a magnetic recording medium showing magnetic crystalline grains arranged in a form of a tetragonal lattice structure according to an embodiment of the present invention.

Experimental results of the present inventors show that the magnetic crystalline grain arrangement essentially in an ordered structure of tetragonal lattice is desirable because the noise level of recording and reproducing characteristics can be substantially reduced compared with the case for disordered arrangement. FIG. 2 schematically shows a structure having a tetragonal arrangement of magnetic crystalline grains 1 in the magnetic recording layer of the magnetic recording medium in an embodiment of the present invention.

Figure 3:
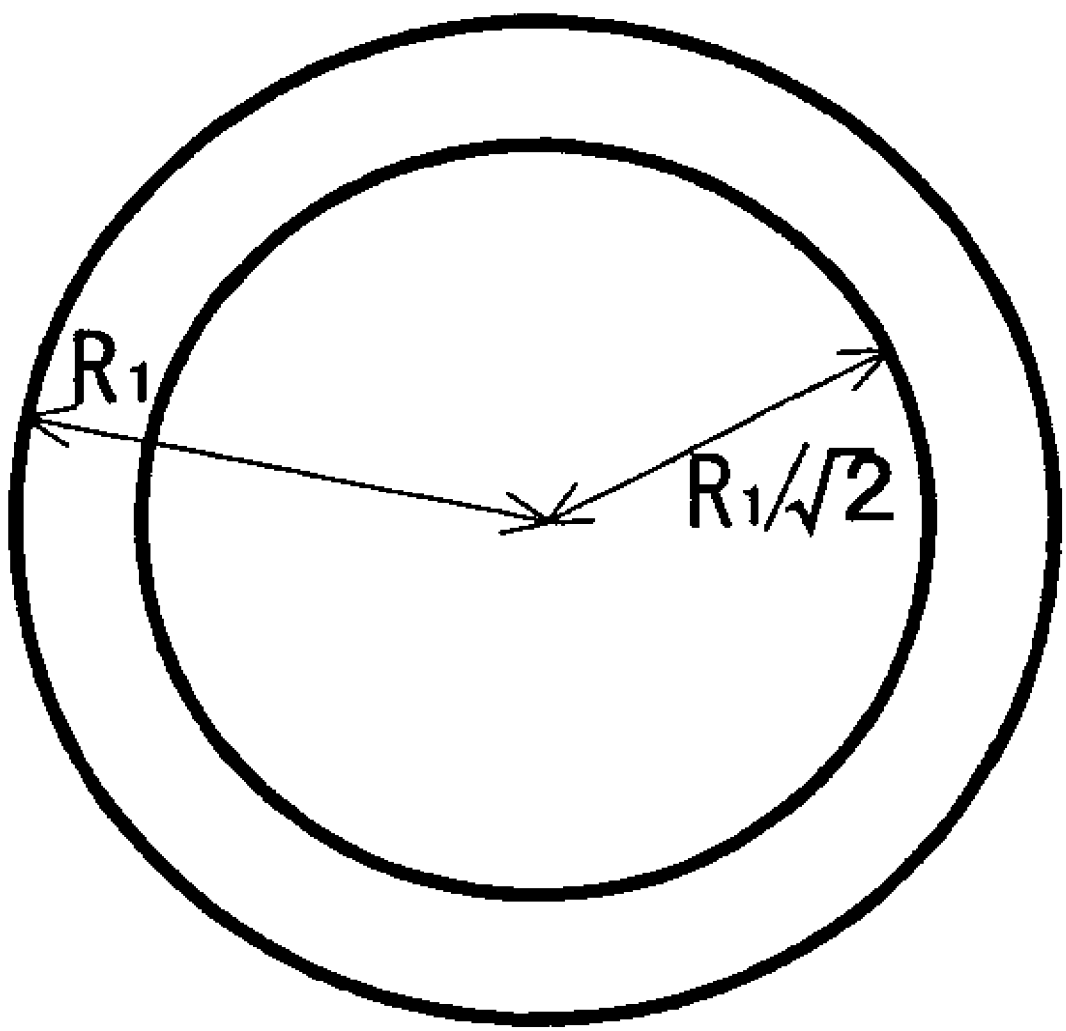
FIG. 3 is a schematically shown example of the ring pattern for the reciprocal lattice for the tetragonal lattice structure.

Tetragonal lattice structure arrangement of magnetic crystalline grains 1 of the magnetic recording layer 14 can be evaluated by image processing and analysis of transmission electron microscope (TEM) figurers for the layer plane of the magnetic recording layer 14. A spectrum can be obtained as a result of a fast Fourier transformation of a binary figure obtained by increasing contrast of the figure for magnetic crystalline grains 1 and grain boundary regions using an image processing and analyzing software. The magnetic crystalline grains can be regarded to have an arrangement of tetragonal lattice structure essentially when patterns as shown in FIG. 3 can be recognized. Practically, the arrangement can be confirmed by finding two type periodical spots or rings having a rate of the distances to the center is $1:1/\sqrt{2}$ ($R_1$ and $R_1/2^{1/2}$ in FIG. 3). Similar evaluation can be performed using low energy electron diffraction to the magnetic recording layer and analyzing the diffraction patterns.

Figure 4:
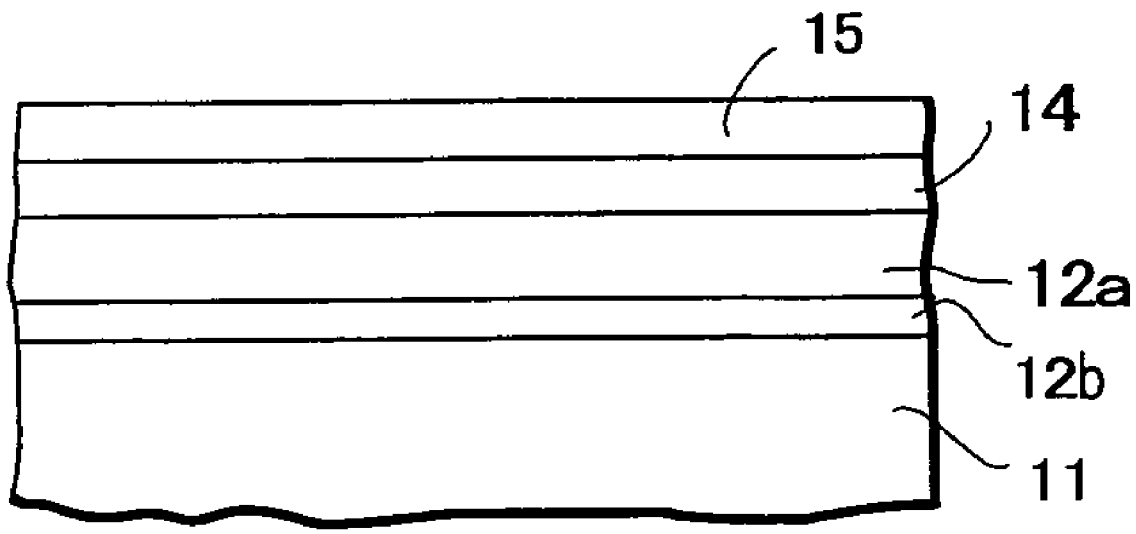
FIG. 4 is a schematically shown cross section view of a magnetic recording medium comprising an orientation control under-layer according to an embodiment of the present invention.

As shown in FIG. 4, an orientation control under-layer 12b for increasing (100) plane orientation of the crystalline grains in the large grain diameter under-layer 12a is desirable to be disposed between the substrate 11 and large grain diameter under-layer 12a.

For the practical material for orientation control under-layer 12b, at least one selected from the group consisting essentially of NiAl, MnAl, MgO, NiO, TiN, Si, and Ge can be used. The orientation control under-layer 12b need not be disposed directly adjacent to the large grain diameter under-layer 12a.

It is desirable that crystalline grains of the orientation control under-layer 12b have a (100) orientation, because higher orientation degree of Cu, Rh, or Ni crystalline grains in the large grain diameter under-layer 12a can be obtained.

In this case, larger average diameter crystalline grains of orientation control under-layer 12b are desirable because the growth of the Cu, Rh, or Ni grains is promoted. The desirable average diameter of the grains is 50 nm or larger, and the more desirable average diameter of the grains is 100 nm or larger. A single crystal film having no grain boundary is much more desirable. When the film is uneven at a certain degree, the film is available provided that the film has large fraction of terrace surfaces that form the film surface.

For the magnetic recording medium of the present invention, a magnetic recording layer 14 having a granular structure is desirable. The nonmagnetic grain boundary regions of the granular structure in the magnetic recording layer 14 causes a decrease in the exchange interaction between magnetic crystalline grains and leads an increase in SNR.

As the materials for the magnetic recording layer 14, disordered alloys such as Co—Cr and Co—Pt, ordered alloys such as Fe—Pt, Co—Pt and Fe—Pd, and multi layered film materials such as Co/Pt and Co/Pd can be desirably used. These alloys and multi-layered film materials are desirable for their high thermal fluctuation durability because these materials have high crystalline anisotropy energy. Magnetic properties of these alloy and multi-layered materials can be improved by adding some additive elements such as Cu, B, and Cr as necessary.

The magnetic recording layer 14 can be double structure or more multi-layer structure. In these structures, the advantage of the granular structure can be obtained when at least one of the multi-layers is granular.

Figure 5:
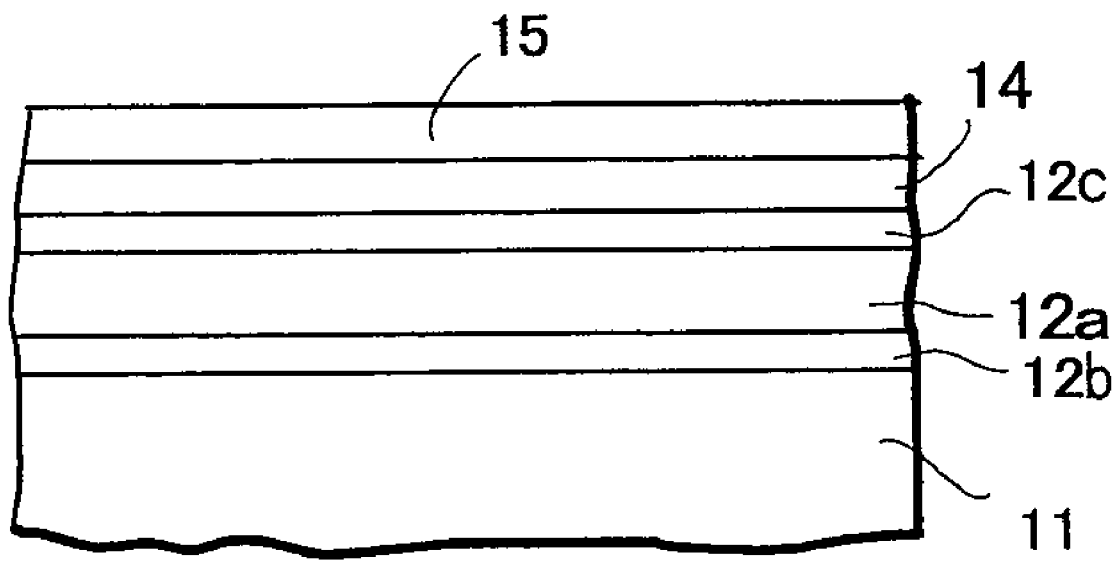
FIG. 5 is a schematically shown cross section view of a magnetic recording medium having an intermediate under-layer according to an embodiment of the present invention.

As shown in FIG. 5, an intermediate under-layer 12c for controlling characteristics of magnetic recording layer 14 can be desirably disposed.

The crystal orientation degree can be improved by using a granular structured layer as the intermediate under-layer 12c. The recording and reproducing characteristics can be increased by the improved crystal orientation degree in addition to the smaller average grain size and smaller grain diameter distribution.

For the nonmagnetic crystalline materials of the intermediate under-layer 12c showing granular structure, Pt, Pd, Ir, Ag, Cu, Ru, and Rh, for example, can be used. These metal materials are desirable because they show good lattice matching with magnetic crystalline grains of the magnetic recording layer 14 described above and they can improve crystal orientation degree of magnetic crystalline grains of the magnetic recording layer 14.

As the materials of the intermediate under-layer 12c for composing grain boundary regions of the granular structure, chemical compounds such as oxides, nitrides and carbides are desirable. These compounds are suitable for composing grain boundary regions because they do not form solid solution with the materials for forming the magnetic crystalline grains described above and they can be separated easily. Compounds such as $SiO_x$, $TiO_x$, $CrO_x$, $AlO_x$, $MgO_x$, $TaO_x$, $SiN_x$, $TiN_x$, $AlN_x$, $TaN_x$ $SiC_x$, $TiC_x$ and $TaC_x$ can be cited as materials for forming the grain boundary regions. The materials constructing the under-layer can include magnetic element when the under-layer is nonmagnetic as the whole.

Figure 6:
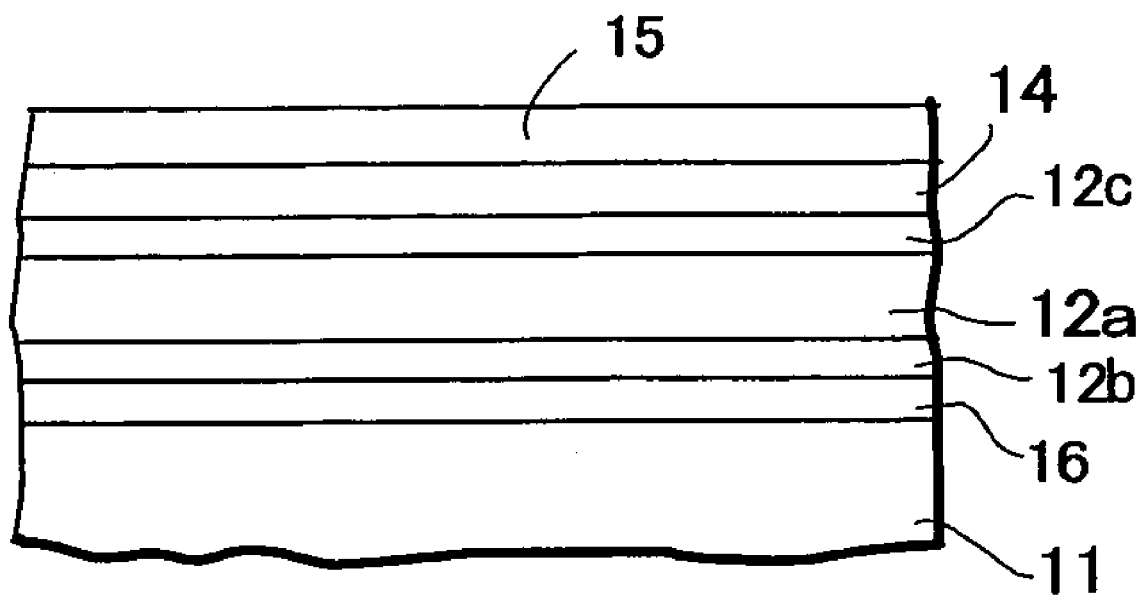
FIG. 6 is a schematically shown cross section view of a magnetic recording medium having a soft magnetic under-layer according to an embodiment of the present invention.

When the magnetic recording medium of the present invention is applied as a perpendicular magnetic recording medium, a soft magnetic under-layer 16 can be disposed between the large grain diameter under-layer 12a and the substrate 11 as shown in FIG. 6.

Disposing the soft magnetic under-layer 16 in the magnetic recording medium described above, so-called perpendicular double-layered medium is constructed. The soft magnetic under-layer 16 play a partial function of a magnetic head of returning magnetic flux induced by the recording magnetic field from a single pole head passing horizontally through the magnetic recording medium and turning back to the magnetic head. Therefore, the soft magnetic under-layer 16 disposed in the magnetic recording medium plays a role for obtaining a sharp and sufficient perpendicular magnetic field with sufficient magnitude, and for increasing the recording and reproducing efficiency.

CoZrNb, FeSiAl, FeTaC, CoTaC, NiFe, Fe, FeCoB, FeCoN and FeTaN can be cited as the soft magnetic under-layer 16, for example.

Figure 7:
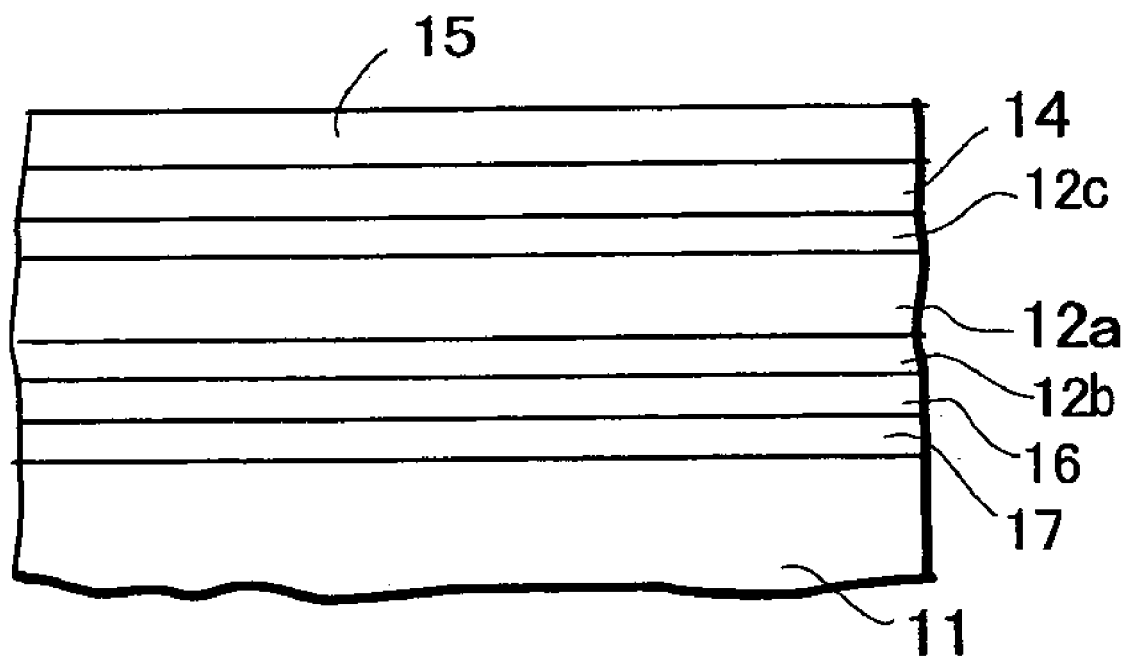
FIG. 7 is a schematically shown cross section view of a magnetic recording medium having a biasing layer for a soft magnetic under-layer according to an embodiment of the present invention.

As shown in FIG. 7, a biasing layer 17 can be disposed between the soft magnetic layer and the substrate 11 as the biasing layer in plane hard magnet film and antiferromagnetic film and so on can be applied. Magnetic domains are easily formed in the soft magnetic under-layer 16, and the magnetic domain walls induce spike like noise. The formation of magnetic domains can be avoided by applying a magnetic field in one radial direction of the biasing layer 17 and applying biasing field to the soft magnetic under-layer placed on the biasing layer 17. The biasing layer 17 can be a multi-layered structure with finely dispersed anisotropy fields to avoid formation of large magnetic domains.

As the material for constructing the biasing layer, CoCrPt, CoCrPtB, CoCrPtTa, CoCrPtTaNd, CoSm, CoPt, FePt, CoPtO, CoPtCrO, CoPt—$SiO_2$, CoCrPt—$SiO_2$ and CoCrPtO—$SiO_2$ can be cited.

Glass substrates, Al alloy substrates or Si single crystal substrates with oxide surfaces, ceramic substrates, and plastic substrate can be used for the substrate 11. These inorganic substrates plated with NiP, for example, can be used.

Protective layer 15 can be formed on the magnetic recording layer 14. For the protective layer 15, carbon or diamond like carbon can be used. Other materials $SiN_x$, $SiO_x$, and $CN_x$ can be cited as the protective layer material.

As the method for depositing each layer described above, vacuum evaporation method, every kind of sputtering method, molecular beam epitaxy method, ion beam evaporation method, laser abrasion method and chemical vapor deposition method can be used.

Figure 8:
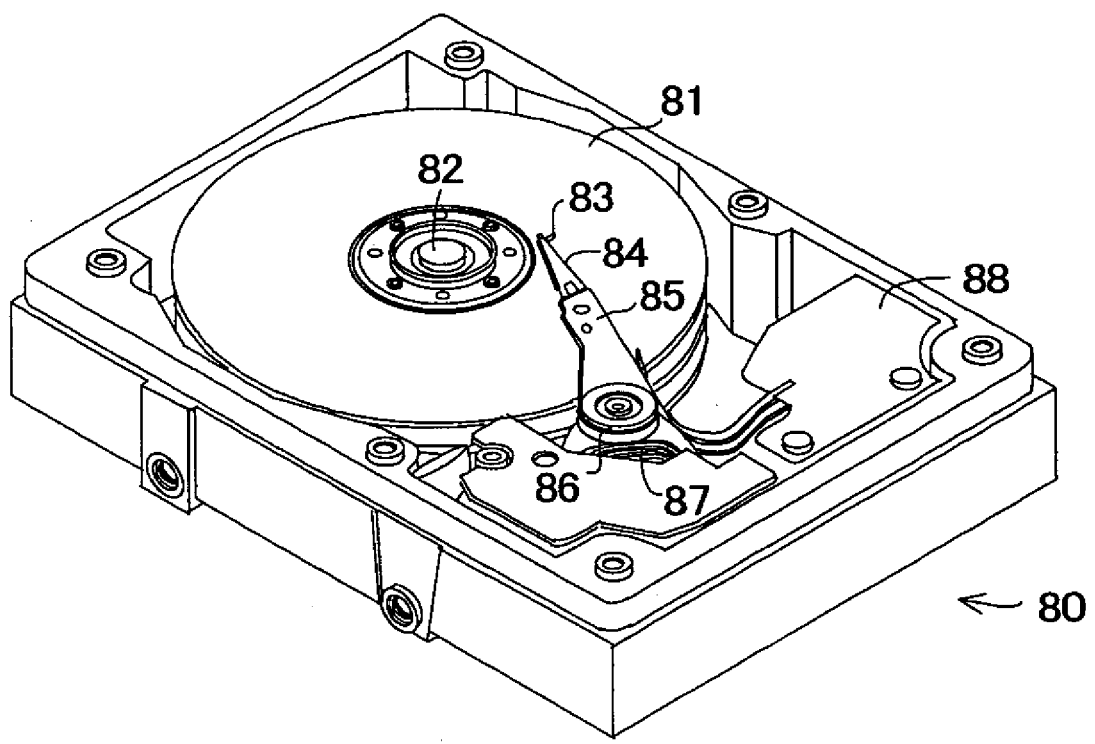
FIG. 8 is a schematically shown oblique view of a magnetic recording apparatus according to an embodiment of the present invention showing the construction by partially removing the covers.

FIG. 8 is oblique view of a magnetic recording apparatus according to an embodiment of the present invention schematically showing the construction by partially removing covers.

In FIG. 8, the magnetic disk 81 according to the present invention is attached to the spindle 82, and is driven at a constant rotating speed by a spindle motor not shown in the figure. The slider 83 having a recording head for recording information and a MR head and reproducing the recorded information accessing to the surface of the magnetic disk 81 is attached at the top of a suspension 84 constructed by a thin plate shaped flat spring. The suspension 84 is connected to one side of an arm 85 having a bobbin holding a drive coil not shown in the figure.

At the other side of the arm 85, a voice coil motor 86, a kind of linear motor, is disposed. The voice coil motor 86 is constructed by a magnetic circuit composed of a drive coil rolled up to a bobbin of arm 85, permanent magnet and opposing yokes.

The arm 85 is supported by a ball bearing not shown in the figure fixed at the upper and lower sides of fixed axis 87, and is drived to swing circularly by the voice coil motor 86. The voice coil motor 106 controls the position of the slider 83 on the magnetic disk 81. In the FIG. 8, a cover 88 is shown partially.

Hereinafter, examples of the present invention will be described to explain the present invention further in detail.

Example 1

Nonmagnetic 2.5 inches glass substrates were put into a vacuum chamber of an ANELVA Co. sputtering apparatus.

The vacuum chambers of the sputtering apparatus were evacuated to $1 \times 10^{-6}$ Pa or less. Then the substrates were heated using an infrared heater up to about 300° C. Keeping each substrate temperature to about 300° C., about 200 nm CoZrNb film was deposited as a soft magnetic under-layer, and then an about 30 nm Cu film was deposited as the large diameter grain under-layer, and then 5 nm thick $Fe_{50}Pt_{50}$ film was deposited as a magnetic recording layer, and furthermore, a 5 nm carbon film was formed for protecting film for each substrate.

For the deposition of CoZrNb, $Fe_{50}Pt_{50}$ and C films, the Ar gas pressure was controlled to 0.7 Pa, 5 Pa and 0.7 Pa, respectively, and for the deposition of Cu film, the deposition was performed in an atmosphere of 0.7 Pa Ar-3% $H_2$. DC sputtering was used for the sputtering deposition and sputtering target materials, CoZrNb, $Fe_{50}Pt_{50}$, Cu and C were used. Power inputted to the targets was fixed to 1,000 W for CoZrNb, $Fe_{50}Pt_{50}$ and C deposition, and varied from in a range from 100 to 1,000 W for Cu deposition.

Other magnetic recording medium samples were prepared using essentially the same deposition procedure except that Ni and Rh respectively were used instead of the Cu described above. Samples having $Co_{50}Pt_{50}$, $Fe_{50}Pd_{50}$, and $Co_{70}Cr_{10}Pt_{10}$, respectively as the magnetic recording layer instead of the $Fe_{50}Pt_{50}$ were fabricated using essentially the same procedure described above. Furthermore, samples having various crystalline grain diameter of Cu, Rh, and Ni, respectively, were fabricated by changing the input power to the targets.

After finishing these deposition, protective layer of each prepared samples were coated with about 1.3 nm thick lubricant of perfluoropolyether (PFPE) by a dipping method and then magnetic recording medium samples were completed.

As a comparative example, conventional perpendicular magnetic recording media were fabricated by the following procedure. The nonmagnetic 2.5 inches glass substrates were put into the vacuum chambers of the sputtering apparatus and the vacuum chambers were evacuated to $1 \times 10^{-6}$ Pa or less. After heating the substrates using an infrared heater up to about 300° C., 200 nm CoZrNb film as a soft magnetic under-layer, 10 nm Ta film as a seed layer, 20 nm Ru film as a under-layer, 15 nm $Co_{65}$—$Cr_{20}$—$Pt_{14}$—$Ta_1$ layer as a magnetic recording layer, and a 5 nm protective layer were deposited for each substrate, and then the lubricant was coated similar to the Example 1 described above.

For depositing CoZrNb, Ta, Ru and CoCrPtTa films, the Ar gas pressure was 0.7 Pa, 0.7 Pa, 0.7 Pa, 5 Pa and 0.7 Pa, respectively, and target materials were CoZrNb, Ta, Ru and $Co_{65}Cr_{20}Pt_{14}Ta_1$, respectively. DC sputtering was used for the deposition. Power inputted to the targets was fixed to 1,000 W.

The microstructure, the crystalline grain diameters and the grain size distribution of each fabricated sample were evaluated by a transmission electron microscope (TEM) with accelerating voltage of 400 kV.

Oxygen, carbon, nitrogen and sulfur contents were evaluated by using SIMS with $Cs^+$.

Recording and reproducing characteristics (read write characteristics, R/W characteristics) of each magnetic recording medium were evaluated using a spin stand. The magnetic head applied was a combination of a 0.3 μm track width single pole head and a 0.2 μm track width MR head. The same measuring condition of fixed magnetic head position of 20 mm from the center and the magnetic disk rotating speed of 4,200 rpm was applied. Signal to noise ratio for derivative waveforms as an output of a derivative circuit ($SNR_m$) was measured and characterized as the SNR of the magnetic recording medium. The measured signal S was for outputs of linear recording density of 119 kfci, and the measured noise $N_m$ was root mean square value at 716 kfci. In addition, the OW was evaluated 119 kfci signal output ratio for recorded 119 kfci signals before and after overwritten by 250 kfci signal.

Table 1 shows evaluated results of the average crystalline grain diameter $d_{mag}$, OW and SNR of each magnetic recording medium.

TABLE 1

|  | Large Diameter Grain Under-layer | Magnetic recording layer | $d_{Mag}$ (nm) | SNR (dB) | OW (dB) |
| --- | --- | --- | --- | --- | --- |
| Example 1-1 | Cu | FePt | 5.8 | 16.0 | 38 |
| Example 1-2 | Cu | CoCrPt | 5.9 | 16.2 | 39 |
| Example 1-3 | Cu | CoPt | 6.0 | 16.0 | 37 |
| Example 1-4 | Cu | FePd | 6.0 | 15.9 | 38 |
| Example 1-5 | Ni | FePt | 5.9 | 16.1 | 39 |
| Example 1-6 | Ni | CoCrPt | 5.9 | 16.0 | 39 |
| Example 1-7 | Ni | CoPt | 6.1 | 15.9 | 38 |
| Example 1-8 | Ni | FePd | 6.1 | 15.8 | 40 |
| Example 1-9 | Rh | FePt | 6.0 | 16.2 | 40 |
| Example 1-10 | Rh | CoCrPt | 5.9 | 16.3 | 39 |
| Example 1-11 | Rh | CoPt | 6.1 | 15.9 | 38 |
| Example 1-12 | Rh | FePd | 6.0 | 16.0 | 37 |
| Comparative Example |  | (conventional medium) | 7.1 | 15.4 | 32 |

Compared with the conventional media, each magnetic recording medium of Example 1 showed small average grain diameter and increase in OW and SNR. XRD evaluation showed that no peak related to the large diameter grain under-layers was found other than (100) crystal plane of them, showing that all grains of the large diameter grain under-layers were in (100) orientation.

Figure 9:
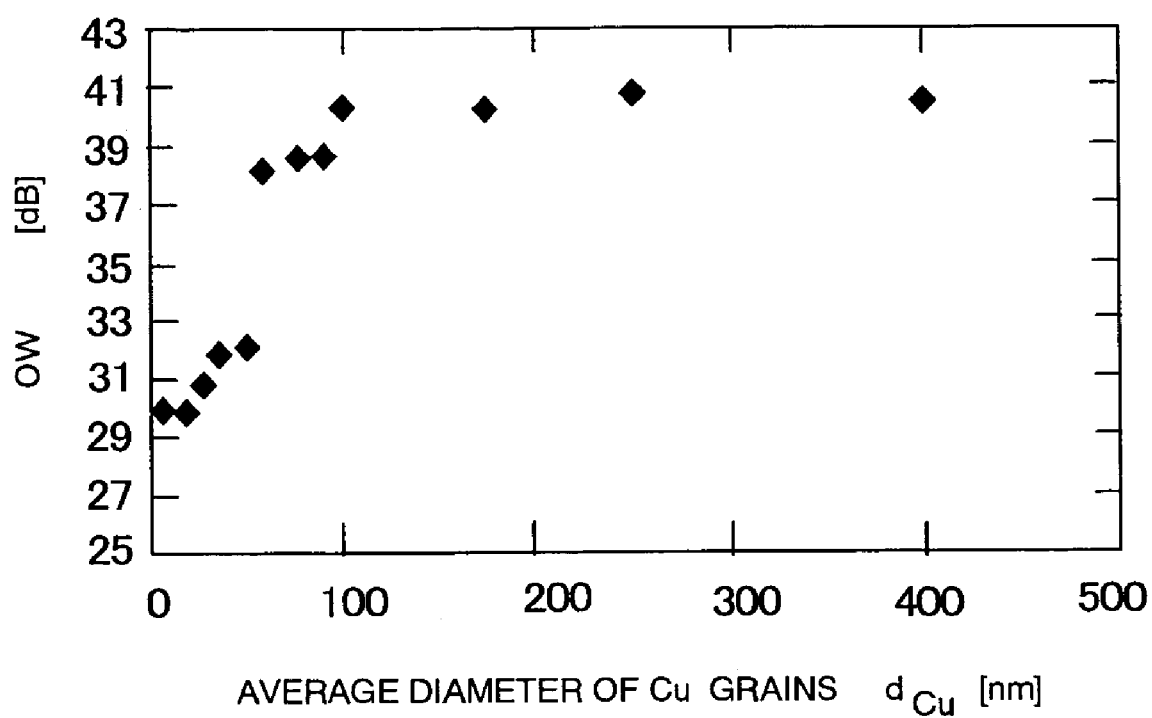
FIG. 9 is a graph showing the relation between the average diameter of Cu and the overwrite characteristics of Example 1.

FIG. 9 shows the relation between the average crystalline grain diameter of Cu $d_{CU}$ and the OW for the $Fe_{50}Pt_{50}$ magnetic recording layer and Cu large grain diameter under-layer. It was found that the OW improved sufficiently when the average crystalline grain diameter of Cu is 50 nm or more. Similar results were obtained for Ni and for Rh large grain diameter under-layer. Furthermore, similar results were obtained for each sample having $Fe_{50}Pt_{50}$, for $Fe_{50}Pd_{50}$, and for $Co_{70}Cr_{10}Pt_{20}$ magnetic recording layer.

Figure 10:
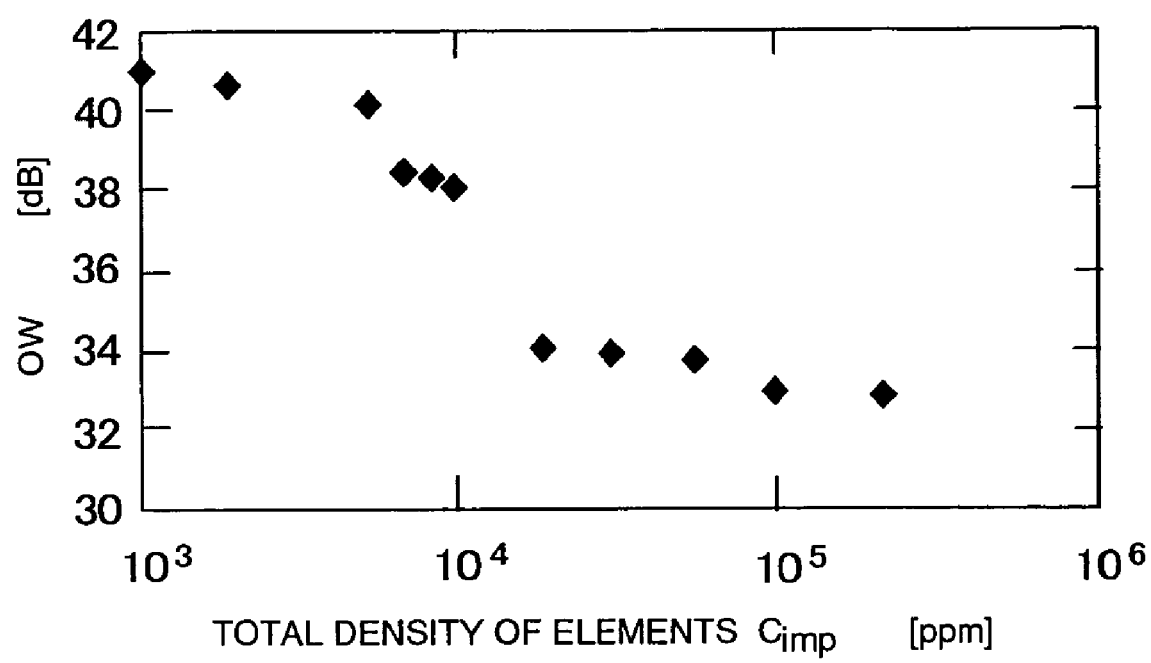
FIG. 10 is a graph showing the relation between the total ppm of oxygen, carbon, nitrogen, sulfur and the overwrite characteristics for Example 1.

FIG. 10 shows the relation between total concentration of oxygen, carbon, nitrogen, and sulfur $C_{imp}$ obtained by SIMS and OW for magnetic recording media with $Fe_{50}Pt_{50}$ magnetic recording layer and Cu large grain diameter under-layer. As seen from the figure, the $C_{imp}$ value of less than 10,000 ppm is desirable to obtain good OW values. Similar results were obtained for $Co_{50}Pt_{50}$, $Fe_{50}Pd_{50}$ and $Co_{70}Cr_{10}Pt_{20}$ magnetic recording layers.

Figure 11:
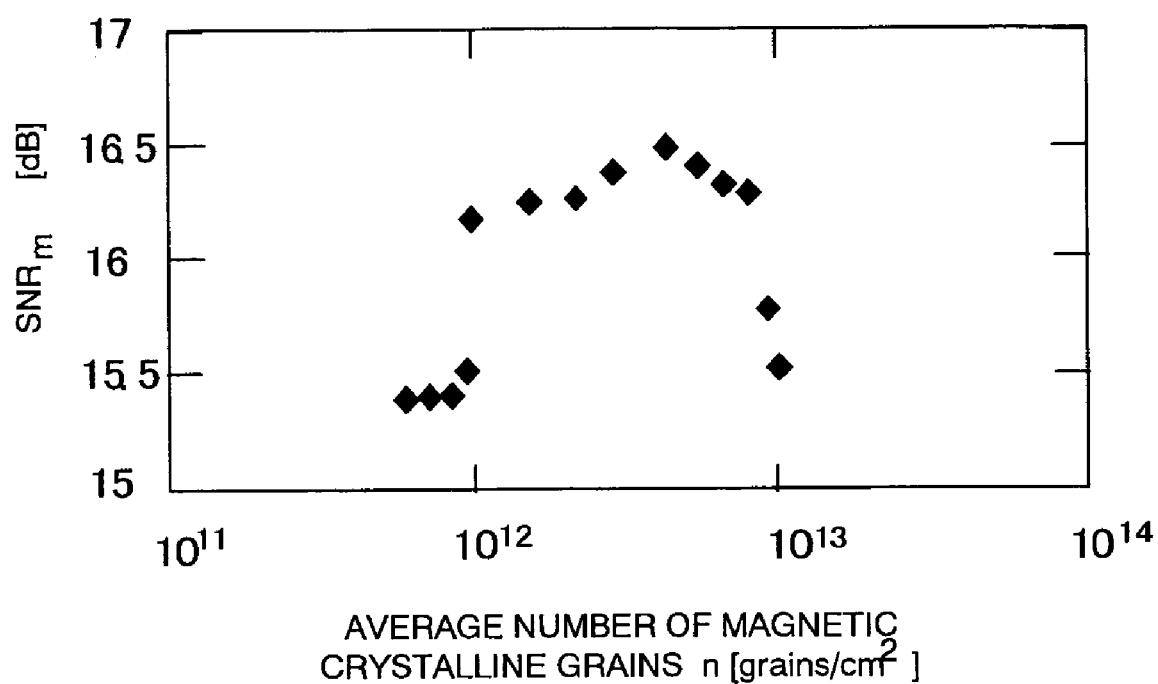
FIG. 11 is a graph showing the relation between the average number of magnetic crystalline grains per square centimeter and the SNR for Example 1.

FIG. 11 shows a relationship between the average magnetic crystalline particle number areal density n of the magnetic recording layer obtained from TEM observation and OW. The desirable n values are in a range from $1 \times 10^{12}$ particles/cm$^2$ to $8 \times 10^{12}$, particles/cm$^2$ for obtaining higher SNR values. When the n value is in a range from $1 \times 10^{12}$ particles/cm$^2$ to $8 \times 10^{12}$, plural number of magnetic crystalline particles on average are held on a Cu crystalline grain. Similar results were obtained for Ni and Rh large grain diameter under-layers. Furthermore, similar results were obtained also for samples having $Co_{50}Pt_{50}$, $Fe_{50}Pd_{50}$ and $Co_{70}Cr_{10}Pt_{20}$ magnetic recording layers.

Ordered arrangement of magnetic crystalline grains was examined for magnetic recording layer TEM figure of each magnetic recording medium using an image processing and analyzing software "Image-Pro Plus" (Cybernetics Co., USA). The TEM figure for each magnetic recording layer was modified to a pattern expressed by two values increasing contrast between regions of magnetic grains and other regions and then the pattern was transformed into a reciprocal lattice pattern by FFT, and evaluated the result. No ordered arrangement was found for conventional medium samples. On the other hand, every magnetic recording medium having n values in a range from $1 \times 10^{12}$ gains/cm$^2$ to $8 \times 10^{12}$ gains/cm$^2$, and having Ni, Rh and Cu under-layer, showed granular structured magnetic recording layer. From FFT analysis for the TEM figure, an essentially tetragonal arrangement of crystalline particles was confirmed by recognizing periodical pattern showing $1:1/\sqrt{2}$ relationship in distances from the center spot.

Example 2

Nonmagnetic 2.5 inches glass substrates were put into the vacuum chamber and the vacuum chambers were evacuated to $1 \times 10^{-6}$ Pa or less. Then CoZrNb soft magnetic under-layer was deposited to each substrate and then put out from the vacuum chamber to ambient atmosphere. Then the samples were put into a MBE chamber and the chamber was evacuated to $1 \times 10^{-9}$ Pa or less, and then a 30 nm Cu under layer was deposited to each substrate in the vacuum. Similarly samples having Ni deposited under-layer and Rh deposited under-layer instead of the Cu under-layer were fabricated using essentially the same procedure. The samples were put out from the chamber to ambient atmosphere, and then put into the sputtering vacuum chamber again. The chamber was evacuated to $2 \times 10^{-6}$ Pa or less. Then the samples were etched by reverse sputtering.

Magnetic recording layer of a 5 nm $Co_{70}Cr_{10}Pt_{20}$—$SiO_2$ was formed to each substrate using $Co_{70}Cr_{10}Pt_{20}$-10 mol % $SiO_2$ composite target. Magnetic recording layers replacing $Co_{70}Cr_{10}Pt_{20}$ by $Fe_{50}$—$Pt_{50}$, $Co_{50}Pt_{50}$ and $Fe_{50}Pd_{50}$ respectively, and replacing $SiO_2$ by TiO, $Al_2O_3$, TiN, AlN and TaN respectively were deposited respectively. Using similar procedure described in Example 1, carbon protective layer was deposited and lubricant layer was coated to each substrate. Then, various magnetic recording medium samples were prepared.

Table 2 shows $SNR_m$ and OW values for each magnetic recording medium employing the Cu large under-layer. It was found that the magnetic layer having composite with chemical compounds is desirable for increasing the SNR, and OW. Similar results were obtained for samples having Ni and Rh large grain diameter under-layer instead of Cu. Each magnetic recording layer composite with the compound showed a granular structure and ordered tetragonal lattice structure arrangement of the magnetic crystalline grains.

TABLE 2

|  | Magnetic recording layer | SNRm (dB) | OW (dB) |
| --- | --- | --- | --- |
| Example 2-1 | CoCrPt | 16.2 | 39 |
| Example 2-2 | CoCrPt—SiO$_2$ | 17.0 | 40 |
| Example 2-3 | CoCrPt—TiO | 17.2 | 40 |
| Example 2-4 | CoCrPt—Cr$_2$O$_3$ | 17.1 | 41 |
| Example 2-5 | CoCrPt—Al$_2$O$_3$ | 16.8 | 40 |
| Example 2-6 | CoCrPt—MgO | 16.7 | 42 |
| Example 2-7 | CoCrPt—Ta$_2$O$_5$ | 16.8 | 41 |
| Example 2-8 | CoCrPt—Si$_3$N$_4$ | 16.6 | 43 |
| Example 2-9 | CoCrPt—AlN | 16.6 | 42 |
| Example 2-10 | CoCrPt—TaN | 16.7 | 41 |
| Example 2-11 | CoCrPt—TiN | 16.7 | 43 |
| Example 2-12 | CoCrPt—TiC | 16.8 | 42 |
| Example 2-13 | CoCrPt—SiC | 16.6 | 44 |
| Example 2-14 | CoCrPt—TaC | 16.6 | 43 |
| Example 2-15 | FePt | 16.0 | 38 |
| Example 2-16 | FePt—SiO$_2$ | 16.9 | 41 |
| Example 2-17 | FePt—TiO | 17.2 | 41 |
| Example 2-18 | FePt—Cr$_2$O$_3$ | 16.9 | 40 |
| Example 2-19 | FePt—Al$_2$O$_3$ | 16.8 | 42 |
| Example 2-20 | FePt—MgO | 17.2 | 40 |
| Example 2-21 | FePt—Ta$_2$O$_5$ | 16.9 | 42 |
| Example 2-22 | FePt—Si$_3$N$_4$ | 16.6 | 42 |
| Example 2-23 | FePt—AlN | 16.7 | 41 |
| Example 2-24 | FePt—TaN | 16.7 | 42 |
| Example 2-25 | FePt—TiN | 16.8 | 41 |
| Example 2-26 | FePt—TiC | 16.6 | 43 |
| Example 2-27 | FePt—SiC | 16.7 | 43 |
| Example 2-28 | FePt—TaC | 16.7 | 41 |
| Comparative Example | (conventional medium) | 15.4 | 32 |

Example 3

2.5 inch hard disk shaped nonmagnetic glass substrates were prepared and film depositions were performed using the same procedure as shown in Example 1 up to Cu, Ni, or Rh deposition. The substrates with the deposited films were annealed in a heating chamber at 500° C. in an atmosphere of Ar-3% H$_2$ for 10 minutes. Then 10 nm Pt—SiO$_2$ was deposited as an intermediate under-layer using Pt-10 mol % SiO$_2$ composite target. Various magnetic recording media were fabricated by depositing magnetic recording layers of $Co_{70}Cr_{10}Pt_{20}$—$SiO_2$ on the Pt—$SiO_2$ layer and carbon protective layer, and coating lubricant layer using the same fabricating conditions as described in Example 2.

Furthermore, various magnetic recording media were obtained replacing Pt of the intermediate under-layer by Pd, Ir, Ag, Cu, Ru and Rh respectively, and the $SiO_2$ by TiO, $Al_2O_3$, TiN, AlN, TaN, TiC, and TaC respectively, preparing and using respective targets.

Furthermore, magnetic recording layer having $Fe_{50}$—$Pt_{50}$, $Co_{50}Pt_{50}$ and $Fe_{50}Pd_{50}$ respectively instead of the $Co_{70}Cr_{10}Pt_{20}$—$SiO_2$, and $Cr_2O_3$, TiO, $Al_2O_3$, MgO, $Ta_2O_5$, SiN, TiN, AlN, TaN, SiC, TiC, and TaC respectively instead of the $SiO_2$, were deposited, preparing and using targets for each deposition.

Table 3 shows $SNR_m$ and OW values for each magnetic recording medium employing the CoCrPt—$SiO_2$ magnetic recording layer and the Cu large grain diameter under-layer. It is found that the $SNR_m$ and OW increase employing intermediate under-layer having composite with chemical compound as an under-layer of the magnetic recording layer. Similar results were obtained for magnetic recording media employing Ni and Rh large grain diameter under-layer respectively instead of Cu under-layer. It was found that every magnetic recording layer and intermediate under-layer were granular and TEM patterns of ordered tetragonal lattice structure arrangement of magnetic crystalline grains was observed for every magnetic recording layer employed Ni, Cu or Rh large grain diameter under-layer.

TABLE 3

| | Under-layer | SNRm [dB] | OW [dB] |
|---|---|---|---|
| Example 3-1 | Pt | 17.7 | 44 |
| Example 3-2 | Pd | 17.7 | 43 |
| Example 3-3 | Ir | 17.5 | 44 |
| Example 3-4 | Ag | 17.4 | 45 |
| Example 3-5 | Cu | 17.4 | 45 |
| Example 3-6 | Ru | 17.8 | 44 |
| Example 3-7 | Rh | 17.7 | 43 |
| Example 3-8 | Pt—$SiO_2$ | 18.6 | 47 |
| Example 3-9 | Pd—$SiO_2$ | 18.5 | 48 |
| Example 3-10 | Ir—$SiO_2$ | 18.4 | 48 |
| Example 3-11 | Ag—$SiO_2$ | 18.3 | 49 |
| Example 3-12 | Cu—$SiO_2$ | 18.4 | 49 |
| Example 3-13 | Ru—$SiO_2$ | 18.8 | 46 |
| Example 3-14 | Rh—$SiO_2$ | 18.7 | 47 |
| Example 3-15 | Pt—TiO | 18.8 | 47 |
| Example 3-16 | Pd—TiO | 18.9 | 46 |
| Example 3-17 | Ir—TiO | 18.7 | 47 |
| Example 3-18 | Ag—TiO | 18.7. | 47 |
| Example 3-19 | Cu—TiO | 18.5 | 48 |
| Example 3-20 | Ru—TiO | 18.9 | 46 |
| Example 3-21 | Rh—TiO | 18.8 | 49 |
| Example 3-22 | Pt—$Cr_2O_3$ | 18.6 | 48 |
| Example 3-23 | Pd—$Cr_2O_3$ | 18.7 | 47 |
| Example 3-24 | Ir—$Cr_2O_3$ | 18.6 | 49 |
| Example 3-25 | Ag—$Cr_2O_3$ | 18.5 | 49 |
| Example 3-26 | Cu—$Cr_2O_3$ | 18.6 | 48 |
| Example 3-27 | Ru—$Cr_2O_3$ | 18.7 | 47 |
| Example 3-28 | Rh—$Cr_2O_3$ | 18.6 | 49 |
| Example 3-29 | Pt—$Si_3N_4$ | 18.4 | 49 |
| Example 3-30 | Pd—$Si_3N_4$ | 18.5 | 47 |
| Example 3-31 | Ir—$Si_3N_4$ | 18.3 | 48 |
| Example 3-32 | Ag—$Si_3N_4$ | 18.3 | 49 |
| Example 3-33 | Cu—$Si_3N_4$ | 18.4 | 49 |
| Example 3-34 | Ru—$Si_3N_4$ | 18.7 | 49 |
| Example 3-35 | Rh—$Si_3N_4$ | 18.6 | 48 |
| Example 3-36 | Pt—TiC | 18.3 | 49 |
| Example 3-37 | Pd—TiC | 18.5 | 48 |
| Example 3-38 | Ir—TiC | 18.3 | 49 |
| Example 3-39 | Ag—TiC | 18.4 | 49 |
| Example 3-40 | Cu—TiC | 18.5 | 47 |
| Example 3-41 | Ru—TiC | 18.5 | 47 |
| Example 3-42 | Rh—TiC | 18.6 | 47 |
| Comparative Example | (conventional medium) | 15.4 | 32 |

Example 4

2.5 inch hard disk shaped nonmagnetic glass substrates were prepared and a soft magnetic under-layer was deposited to each substrate using the fabricating procedure similar to the procedure of Example 1. Then 5 nm NiAl layer was deposited to each substrate in 0.7 Pa Ar atmosphere preparing and using NiAl target. Similarly, MgO, NiO, MnAl, Ge, Si or TiN layer respectively was deposited instead of the NiAl layer.

The deposited substrates were put out from the chamber, and Cu (or Ni, Rh) film was MBE deposited. The substrates were put back to the sputtering chamber, and evacuated the chamber to $2 \times 10^{-6}$ Pa or less, and annealed at 500° C. for 10 minutes in Ar-3% $H_2$ atmosphere in a heating zone of the chamber. Then magnetic recording medium samples were obtained after depositing a intermediate under-layer, a magnetic recording layer and a protective layer subsequently and coating lubricant to each substrate using the method described in Example 3.

Table 4 shows recording and reproducing characteristics of each magnetic recording medium sample employing a Pt—$SiO_2$ intermediate under-layer and a CoCrPt—$SiO_2$ magnetic recording layer. It was found that $SNR_m$ and OW values further increase by disposing an orientation control under-layer. Similar results were found also for other combination of intermediate under-layers and magnetic recording layers.

Figure 12:
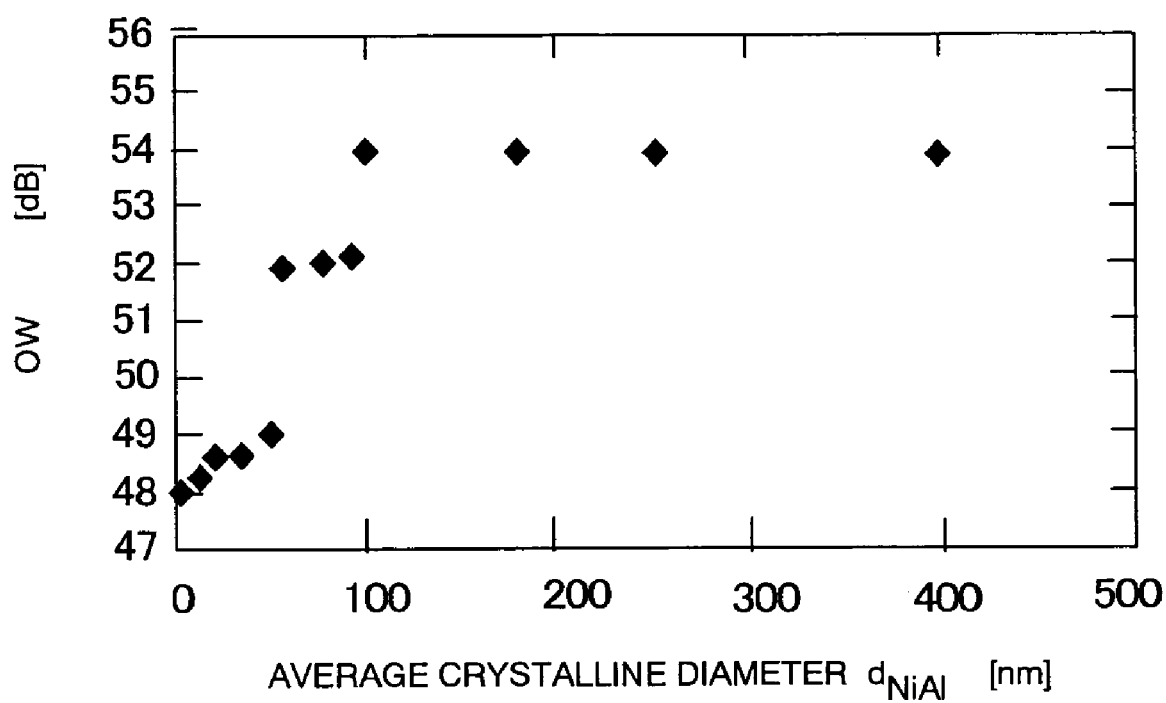
FIG. 12 is a graph showing the relation between the average diameter of NiAl grain and the overwrite characteristics for Example 4.

FIG. 12 shows the relation between average diameter of NiAl $d_{NiAl}$ and OW for magnetic recording media employing NiAl as orientation control under-layer, Cu as large grain diameter under-layer, large grain diameter under-layer, Pt—$SiO_2$ as intermediate under-layer and CoCrPt—$SiO_2$ as magnetic recording layer. It was found that the OW was further improved by increasing the average diameter of the NiAl layer $d_{NiAl}$ to 50 nm or more than 50 nm. Similar results were obtained for other combinations of orientation control under-layers, large grain diameter under-layers, intermediate under-layers and magnetic recording layers.

TABLE 4

| | Orientation control Under-layer | Large diameter grain under-layer | SNRm [dB] | OW [nm] |
|---|---|---|---|---|
| Example 4-1 | None | Cu | 18.6 | 47 |
| Example 4-2 | NiAl | Cu | 19.6 | 52 |
| Example 4-3 | MgO | Cu | 19.7 | 52 |
| Example 4-4 | NiO | Cu | 19.5 | 53 |
| Example 4-5 | MnAl | Cu | 19.3 | 54 |
| Example 4-6 | Ge | Cu | 19.3 | 54 |
| Example 4-7 | Si | Cu | 19.5 | 53 |
| Example 4-8 | TiN | Cu | 19.7 | 53 |
| Example 4-9 | None | Ni | 18.5 | 48 |
| Example 4-10 | NiAl | Ni | 19.5 | 53 |
| Example 4-11 | MgO | Ni | 19.4 | 52 |
| Example 4-12 | NiO | Ni | 19.6 | 52 |
| Example 4-13 | MnAl | Ni | 19.4 | 54 |
| Example 4-14 | Ge | Ni | 19.3 | 55 |

TABLE 4-continued

|  | Orientation control Under-layer | Large diameter grain under-layer | SNRm [dB] | OW [nm] |
| --- | --- | --- | --- | --- |
| Example 4-15 | Si | Ni | 19.3 | 54 |
| Example 4-16 | TiN | Ni | 19.5 | 55 |
| Example 4-17 | None | Rh | 18.4 | 49 |
| Example 4-18 | NiAl | Rh | 19.5 | 52 |
| Example 4-17 | MgO | Rh | 19.4 | 52 |
| Example 4-19 | NiO | Rh | 19.3 | 55 |
| Example 4-20 | MnAl | Rh | 19.4 | 55 |
| Example 4-21 | Ge | Rh | 19.5 | 53 |
| Example 4-22 | Si | Rh | 19.6 | 54 |
| Example 4-23 | TiN | Rh | 19.6 | 53 |

Although the prevent invention has been shown and described with respect to best mode embodiments thereof, it should be understood by those skilled in art that the foregoing and various other changes in the form and detail without departing from the spirit and scope of the present invention.

What is claimed is:

1. A magnetic recording medium, comprising:
a substrate;
a large grain diameter under-layer formed on the substrate;
a magnetic recording layer on the under-layer; and
a protecting layer formed on the magnetic recording layer;
wherein the large grain diameter under-layer comprises crystalline grains of at least one selected from the group consisting essentially of Cu, Ni, Rh and Pt, having average grain diameter $d_c$ larger than or equal to 50 nm, and orienting (100) planes of the grains parallel to the substrate surface.

2. The magnetic recording medium as set forth in claim 1, wherein the magnetic recording layer comprises magnetic crystalline grains having average diameter $d_m$ smaller than or equal to 20 nm.

3. The magnetic recording medium as set forth in claim 1, wherein the large grain diameter under-layer has a cleanliness of 10,000 ppm or less as total number of atoms including oxygen, carbon, nitrogen and sulfur.

4. The magnetic recording medium as set forth in claim 1, wherein the magnetic recording layer comprises magnetic crystalline grains held in plural on a crystalline grain of the large grain diameter under-layer in an average areal density range from $1 \times 10^{12}$ grains/cm$^2$ to $8 \times 10^{12}$ grains/cm$^2$.

5. The magnetic recording medium as set forth in claim 1, wherein the magnetic recording layer comprises magnetic crystalline grains arranged in a form of a tetragonal lattice structure.

6. The magnetic recording medium as set forth in claim 1, wherein the magnetic recording layer comprises granular structure having magnetic crystalline grains and grain boundary regions enclosing each of the magnetic crystalline grains.

7. The magnetic recording medium as set forth in claim 1, wherein the magnetic recording layer comprises magnetic crystalline grains of at least one selected from the group consisting essentially of Co—Cr, Co—Pt, Fe—Pt and Fe—Pd.

8. The magnetic recording medium as set forth in claim 1, wherein the magnetic recording medium further comprises a granular structured intermediate under-layer comprising nonmagnetic crystalline grains and grain boundary regions enclosing each of the nonmagnetic crystalline grains disposed between the large grain diameter under-layer and the magnetic recording layer.

9. The magnetic recording medium as set forth in claim 8, wherein the granular structured intermediate under-layer comprises nonmagnetic crystalline grains of at least one selected from the group consisting essentially of Pt, Pd, Ir, Ag, Cu, Ru and Rh.

10. The magnetic recording medium as set forth in claim 1, wherein the magnetic recording medium comprises a soft magnetic under-layer having soft magnetic characteristics disposed between the large grain diameter under-layer and the substrate.

11. The magnetic recording medium as set forth in claim 1, wherein the magnetic recording medium comprises a grain orientation control under-layer having primary a chemical composition of at least one selected from the group consisting essentially of NiAl, MnAl, MgO, NiO, TiN, Si and Ge between the under-layer and the soft magnetic under-layer.

12. The magnetic recording medium as set forth in claim 11, wherein the grain orientation control under-layer comprises grains having average grain diameter $d_o$ of $d_o \geqq 50$ nm and orienting (100) planes of the grains parallel to the substrate surface.

13. A magnetic recording and reproducing apparatus, comprising:
a magnetic recording medium, comprising:
a substrate, a large grain diameter under-layer formed on the substrate, and a magnetic recording layer on the under-layer; and
a protecting layer formed on the magnetic recording layer;
wherein the large grain diameter under-layer comprising crystalline grains of at least one selected from the group consisting essentially of Cu, Ni, Rh and Pt, having average grain diameter $d_c$ of larger than or equal to 50 nm, and orienting (100) planes of the grains parallel to the substrate surface;
a recording medium driving mechanism, driving the magnetic recording medium;
a recording and reproducing head mechanism, recording information to the magnetic recording medium and reproducing from the magnetic recording medium;
a head driving mechanism, driving the recording and reproducing head; and
a recording and reproducing signal processing system, processing recording signals and reproducing signals.

14. A magnetic recording and reproducing apparatus as set forth in claim 13, wherein the recording and reproducing head mechanism comprises a single pole head.

15. The magnetic recording medium as set forth in claim 1, wherein the under-layer is formed directly on the substrate.

16. A magnetic recording and reproducing apparatus as set forth in claim 13, wherein the under-layer is formed directly on the substrate.

* * * * *